(12) United States Patent
Matsui et al.

(10) Patent No.: US 9,509,940 B2
(45) Date of Patent: Nov. 29, 2016

(54) IMAGE OUTPUT DEVICE, IMAGE OUTPUT METHOD, AND RECORDING MEDIUM

(71) Applicant: Kabushiki Kaisha Toshiba, Minato-ku, Tokyo (JP)

(72) Inventors: Hajime Matsui, Yokohama Kanagawa (JP); Youhei Fukazawa, Kawasaki Kanagawa (JP); Shuou Nomura, Yokohama Kanagawa (JP); Shunichi Ishiwata, Urayasu Chiba (JP); Takaya Ogawa, Kawasaki Kanagawa (JP); Atsushi Mochizuki, Kawasaki Kanagawa (JP); Kazuyo Kanou, Yokohama Kanagawa (JP); Akira Moriya, Kawasaki Kanagawa (JP); Yoshiro Tsuboi, Chiba Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 99 days.

(21) Appl. No.: 14/627,986

(22) Filed: Feb. 20, 2015

(65) Prior Publication Data

US 2016/0080687 A1    Mar. 17, 2016

(30) Foreign Application Priority Data

Sep. 12, 2014 (JP) ................................ 2014-186475

(51) Int. Cl.
| | |
|---|---|
| *H04N 5/92* | (2006.01) |
| *H04N 5/84* | (2006.01) |
| *H04N 5/89* | (2006.01) |
| *H04N 5/765* | (2006.01) |
| *H04N 7/01* | (2006.01) |

(52) U.S. Cl.
CPC .............. *H04N 5/765* (2013.01); *H04N 7/014* (2013.01); *H04N 7/0105* (2013.01)

(58) Field of Classification Search
USPC .................................. 386/326, 332–336, 353
See application file for complete search history.

(56) References Cited

U.S. PATENT DOCUMENTS

| | | | |
|---|---|---|---|
| 6,714,717 B1 * | 3/2004 | Lowe ..................... | H04N 9/896 386/207 |
| 8,244,112 B2 | 8/2012 | Sugimoto et al. | |
| 8,290,350 B2 | 10/2012 | Kurita | |
| 8,570,436 B2 | 10/2013 | Nakamura et al. | |
| 2008/0095236 A1 * | 4/2008 | Kim ........................ | H04N 19/51 375/240.13 |
| 2009/0196567 A1 | 8/2009 | Sugimoto et al. | |
| 2009/0196573 A1 | 8/2009 | Kurita | |
| 2012/0176537 A1 | 7/2012 | Nakamura et al. | |
| 2012/0275760 A1 | 11/2012 | Sugimoto et al. | |
| 2013/0011115 A1 | 1/2013 | Kurita | |

FOREIGN PATENT DOCUMENTS

| | | |
|---|---|---|
| JP | 2005-347841 A | 12/2005 |
| JP | 2009-182817 A | 8/2009 |
| JP | 2009-188627 A | 8/2009 |
| JP | 2010-166386 A | 7/2010 |
| JP | 2012-142874 A | 7/2012 |

* cited by examiner

*Primary Examiner* — Nigar Chowdhury
(74) *Attorney, Agent, or Firm* — Knobbe, Martens, Olson & Bear, LLP

(57) ABSTRACT

According to one embodiment, an image output device includes a buffer into which video information input in stream data is written per block, a determination unit configured to determine whether the buffer is in an overflow state due to slow reproduction, and a buffering control unit configured to switch a buffering pattern of the video information based on a determination result of the determination unit.

19 Claims, 20 Drawing Sheets

IMAGE OUTPUT DEVICE, IMAGE OUTPUT METHOD, AND RECORDING MEDIUM

CROSS-REFERENCE TO RELATED APPLICATION

The present application claims the priority based on Japanese Patent Application No. 2014-186475 filed on Sep. 12, 2014, the disclosure of which is all incorporated herein by reference.

FIELD

Embodiments described herein relate generally to an image output device, an image output method and an recording medium.

BACKGROUND

There is a device (such as TV) for reproducing video input in stream data. The "stream data" is seamlessly streaming data, such as broadcast data transmitted via radio waves. Input video information is temporarily stored in a buffer, and is read from the buffer as needed according to a video reproduction situation.

When the video input in stream data are normally reproduced, a speed at which the video information is read from the buffer (which will be called "buffer read speed" below) and a speed at which the video information is written into the buffer (which will be called "buffer write speed" below) are balanced. Therefore, if the buffer capacity is saved to some extent, no problem occurs in reproducing the video in many cases.

When the video input in stream data is slowly reproduced, however, the buffer read speed is lower than the buffer write speed. The buffer capacity cannot be unlimitedly increased, and thus the buffer is finally filled due to continuous slow reproduction. In this case, room for newly-input video information is not present, and the device possibly behaves in an unusual manner.

DETAILED DESCRIPTION

Figure 1:
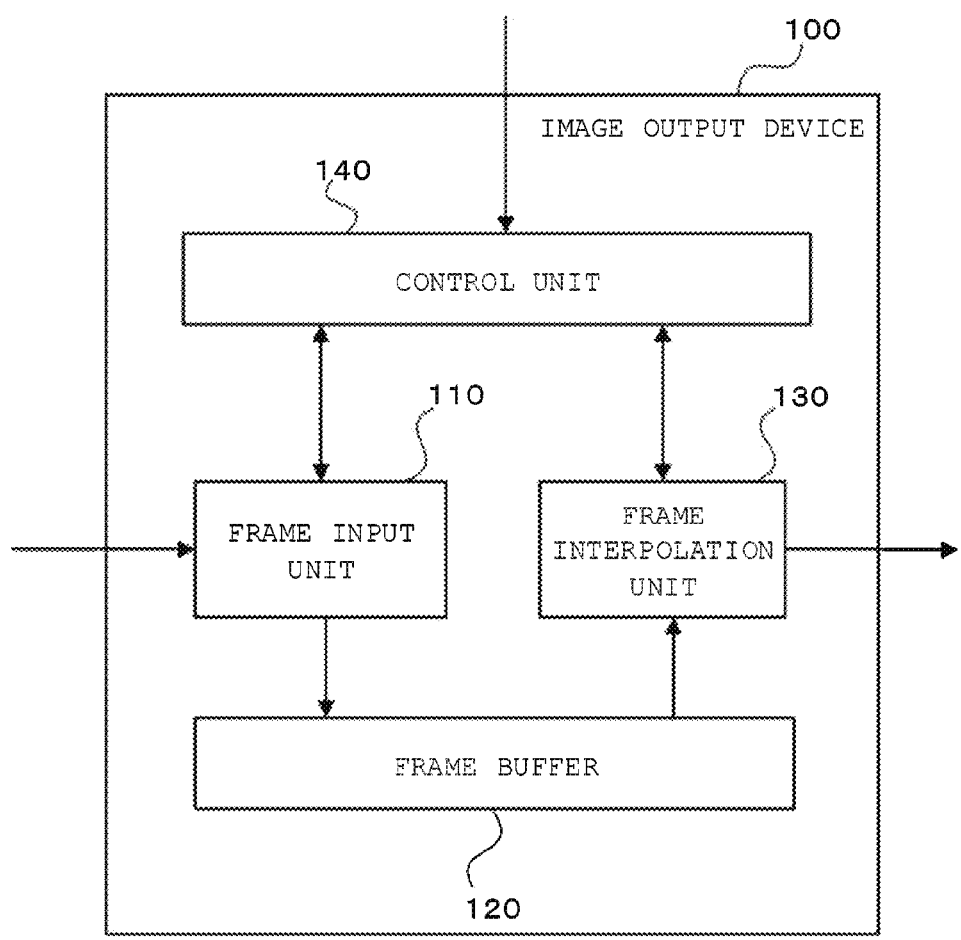
FIG. 1 is a block diagram of an image output device according to a first embodiment.

An image output device according to embodiments includes a buffer into which video information input in stream data is written per block, a determination unit configured to determine whether the buffer is in an overflow state due to slow reproduction, and a buffering control unit configured to switch a buffering pattern of the video information based on a determination result of the determination unit.

The present embodiments will be described with reference to the drawings. The same or like parts are denoted with the same reference numerals in the drawings.

First Embodiment

An image output device 100 is directed for reproducing video information input in stream data. The image output device 100 is a player for outputting video information input via a communication cable such as HDMI (trademark) (High-Definition Multimedia Interface) cable on a display. FIG. 1 is a block diagram of the image output device according to the first embodiment. The image output device 100 includes a frame input unit 110, a frame buffer 120, a frame interpolation unit 130, and a control unit 140.

The frame input unit 110 is an input interface for acquiring video information input in stream data. The video information is configured of a plurality of frames. The frame input unit 110 writes a frame which is input (which will be called "input frame" below) into the frame buffer 120.

Figure 2:
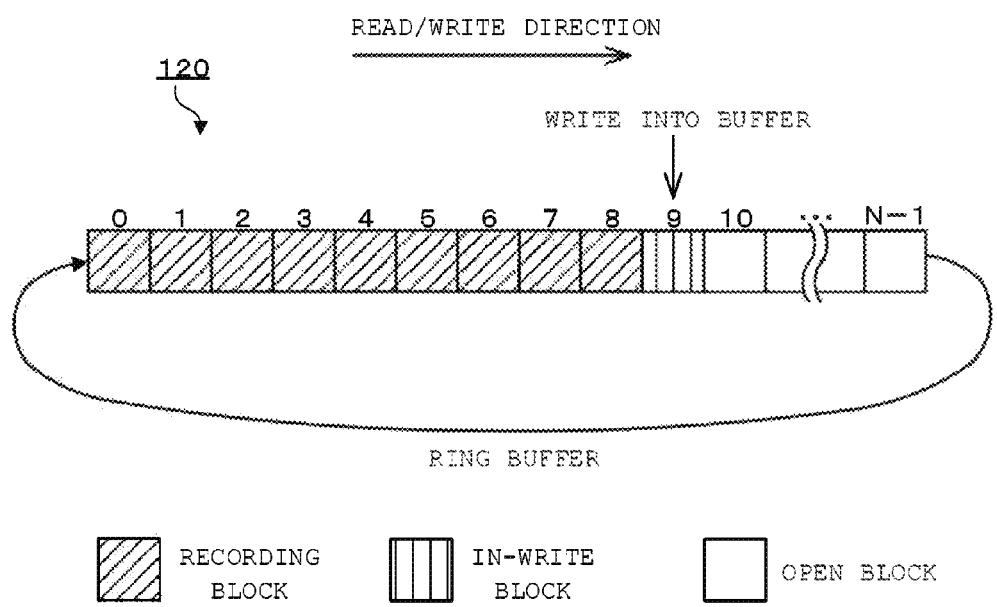
FIG. 2 is a diagram illustrating an exemplary structure of a frame buffer provided in the image output device illustrated in FIG. 1.

The frame buffer 120 is configured of a storage device such as DRAM (Dynamic Random Access Memory) or SRAM (Static Random Access Memory). FIG. 2 is a diagram illustrating an exemplary structure of the frame buffer according to the present embodiment. The storage area in the frame buffer 120 is divided into N blocks. The blocks are denoted with the address numbers 0 to N−1, respectively. One block can store one input frame therein. The frame buffer 120 is a ring buffer. When acquiring video information, the frame input unit 110 writes the input frames into the blocks in order of address. A block into which an input frame is written is read by the frame interpolation unit 130. The read block is opened as a writable block.

In the following description, for easy understanding, a block into which video information is being recorded is called "in-write block", a block into which video information is recorded and which is not open is called "recording block", and a block into which video information is writable and which is opened is called "open block." The control unit 140 manages whether the block is an in-write block, recording block or open block.

Figure 3:
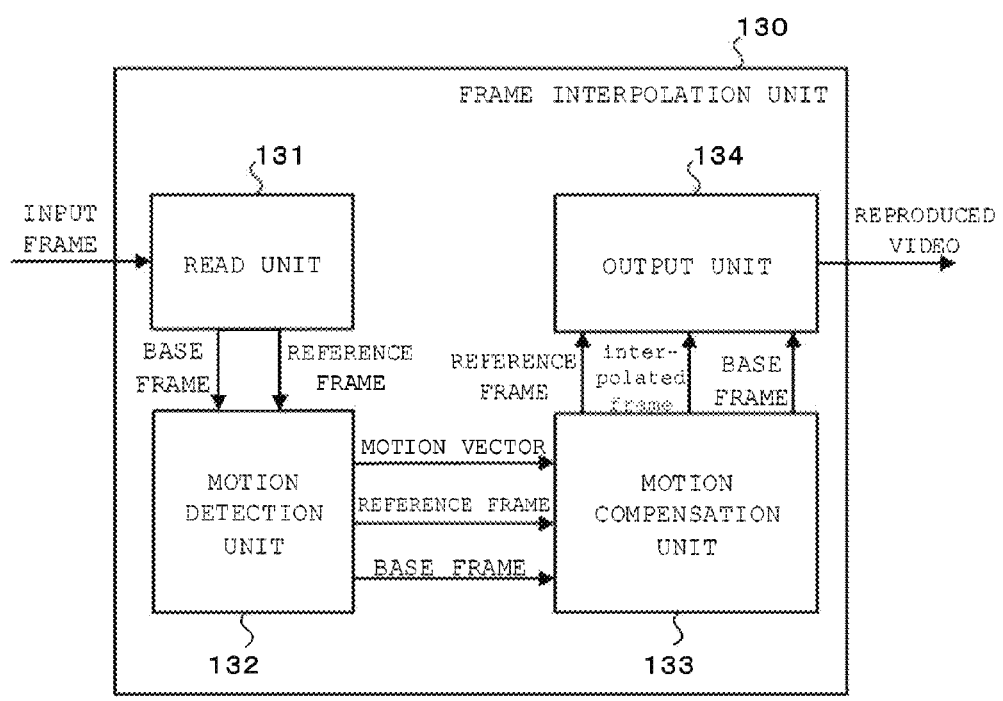
FIG. 3 is a block diagram of a frame interpolation unit provided in the image output device illustrated in FIG. 1.

The frame interpolation unit 130 generates a frame to be inserted between input frames (which will be called "interpolated frame" below) in order to realize smooth slow reproduction or to control hold blurring of liquid crystal. The frame interpolation unit 130 is configured of a processing device such as processor. FIG. 3 is a block diagram of the frame interpolation unit. The frame interpolation unit 130 includes a read unit 131, a motion detection unit 132, a motion compensation unit 133, and an output unit 134.

The read unit 131 reads input frames from the frame buffer 120. The read unit 131 reads input frames from the frame buffer 120 and transmits the read input frames to the motion detection unit 132 under control of the control unit 140.

Figure 4:
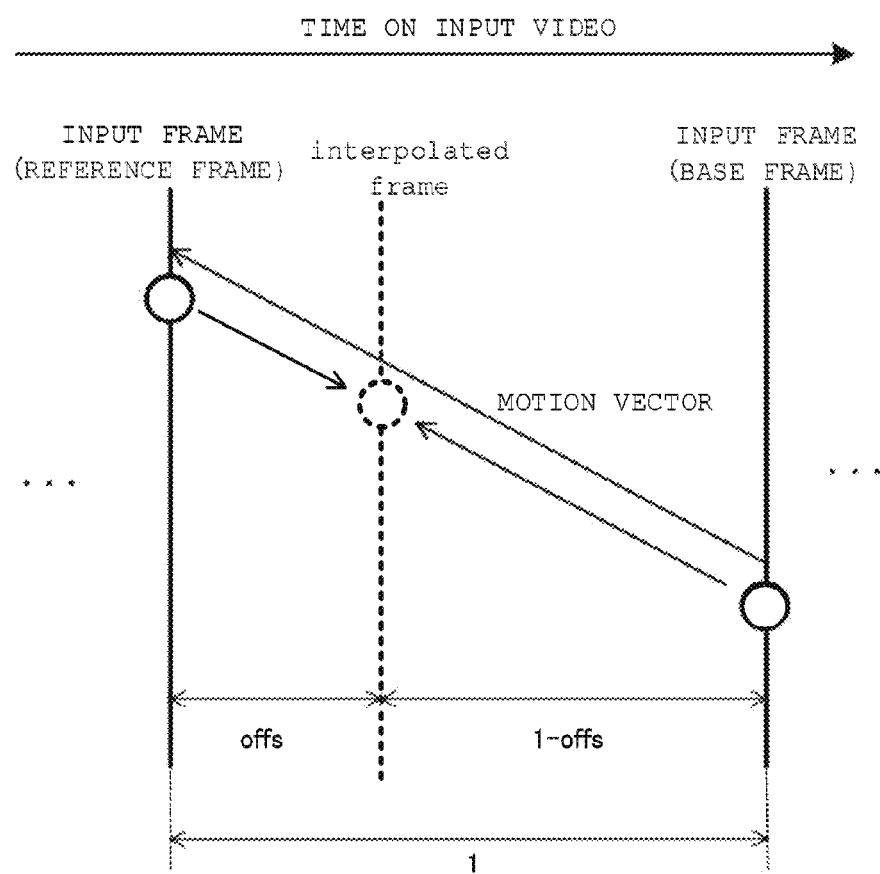
FIG. 4 is a diagram illustrating how an interpolated frame is generated based on input frames.

The motion detection unit 132 makes a motion estimation and finds motion vectors with one of the two acquired input frames as base frame and the other thereof as reference frame. FIG. 4 is a diagram illustrating how an interpolated frame is generated. The motion estimation method may employ a block matching method, a gradient method, or the like. The motion detection unit 132 transmits the motion vectors generated by the motion estimation to the motion compensation unit 133 together with the two input frames to be estimated.

The motion compensation unit 133 generates an interpolated frame to be inserted between the two frames based on the motion vectors. Specifically, the motion compensation unit 133 associates the pixels of the base frame and the reference frame with the pixels of the interpolated frame to be generated based on the motion vectors. The motion compensation unit 133 then selects one pixel from the interpolated frame to be generated, and performs weighted averaging on the pixels of the base frame and the reference frame corresponding to the selected pixel, thereby finding a pixel value of the selected pixel. The weight used for weighted averaging may be a reciprocal ratio of the inter-frame distance ((1−offs):offs) (offs is an interpolation offset value). The motion compensation unit 133 may simply average the two pixel values with a weight of 1:1. Specifically, the interpolation offset value offs is an inter-frame distance between the reference frame and the interpolated frame assuming the inter-frame distance between the reference frame and the base frame as 1, and takes a decimal number between 0 and 1. The motion compensation unit 133 repeats the above processing on all the pixels of the interpolated frame thereby to generate the interpolated frame. The motion compensation method is not limited to the above method, and may employ various well-known methods. The motion compensation unit 133 transmits the generated interpolated frame to the output unit 134 together with the input frames.

The output unit 134 inserts the interpolated frame between the input frames thereby to generate a video signal. The output unit 134 then outputs the generated video signal to an external device such as liquid crystal display.

The control unit 140 is configured of a processing device such as processor. The control unit 140 controls each unit in the image output device 100. The control unit 140 is configured to be able to receive control signals from an external device. The control signals include a "normal reproduction control signal" for causing the image output device 100 to output normal reproduced video, a "slow reproduction control signal" for causing the image output device 100 to output slowly-reproduced video, a "repeat slow reproduction signal" for causing the image output device 100 to repeatedly output the same slowly-reproduced video, and the like.

Figure 5:
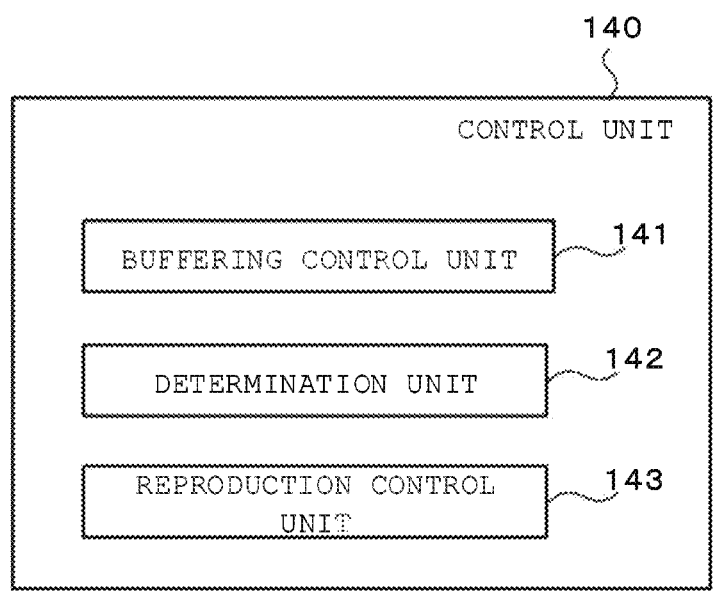
FIG. 5 is a functional block diagram of a control unit provided in the image output device illustrated in FIG. 1.

When receiving a control signal, the control unit 140 performs the "normal reproduction processing", the "slow reproduction processing", or the "repeat reproduction processing." The control unit 140 performs the processing thereby to function as a buffering control unit 141, a determination unit 142, and a reproduction control unit 143 as illustrated in FIG. 5. The control unit 140 may realize the functions in one processor or in cooperation with a plurality of processors.

Each operation of the image output device 100 will be described below.

Figure 6:
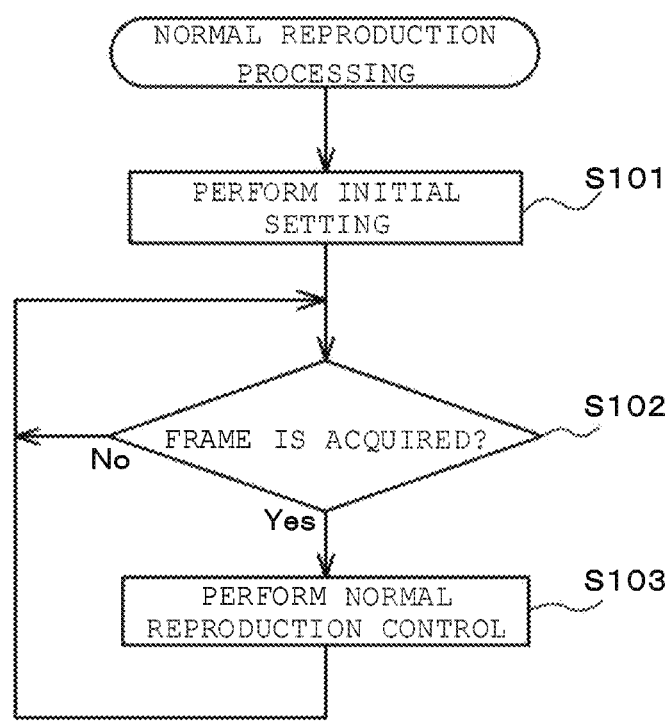
FIG. 6 is a flowchart illustrating reproduction processing according to the embodiment.

The normal reproduction processing will be described first. When receiving a normal reproduction control signal from an external device, the control unit 140 starts the normal reproduction processing. The "normal reproduction processing" is directed for outputting reproduced video at a normal speed on a liquid crystal display or the like. FIG. 6 is a flowchart illustrating the normal reproduction processing.

Figure 7:
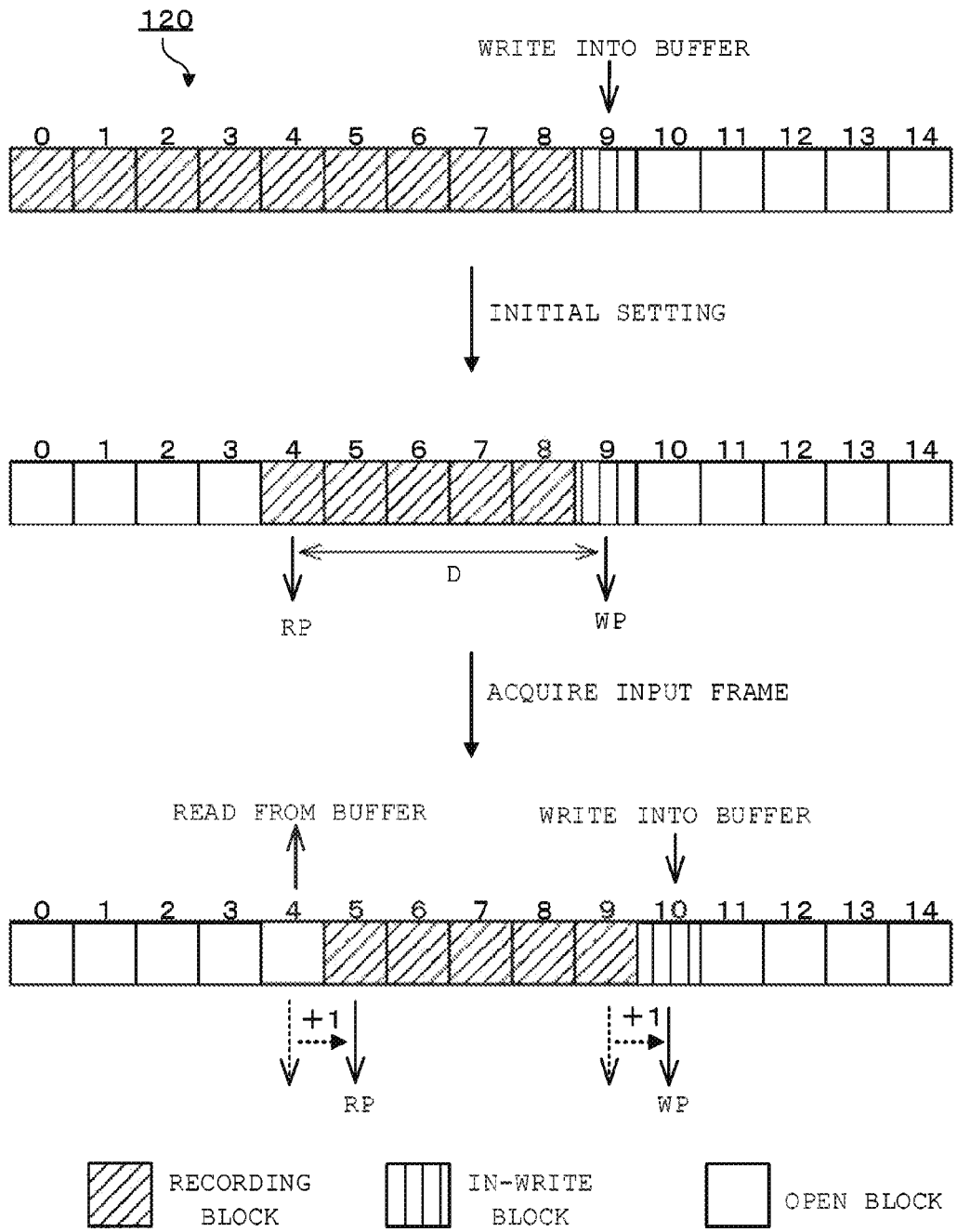
FIG. 7 is a diagram illustrating how the frame buffer buffers on normal reproduction.

The frame buffer 120 can record video information for several seconds to several minutes. For easy understanding, it is assumed, in the following description, that the frame buffer 120 is configured of 15 blocks with the address numbers 0 to 14. FIG. 7 is a diagram illustrating how the frame buffer buffers on normal reproduction.

The buffering control unit 141 performs initial setting based on a buffering situation of the frame buffer 120 (S101). For example, it is assumed that the frame input unit 110 is writing an input frame into the block 9 as illustrated in FIG. 7.

In this case, the buffering control unit 141 stores the address number "9" into a write pointer WP as internal variable. The buffering control unit 141 then stores a block number back from the in-write block by delay D into a read pointer RP. In FIG. 7, the buffering control unit 141 stores the address number "4" into the read pointer RP. Further, the buffering control unit 141 sets the block indicated by the write pointer WP as "in-write block", the blocks from the write pointer WP−1 to the read pointer RP as "recording blocks", and other blocks as "open blocks." The frame buffer 120 is a ring buffer, and thus "1" is subtracted from the address number "0" to be the address number "14."

The determination unit 142 determines whether the frame input unit 110 acquires a new input frame (S102). When the frame input unit 110 acquires a new input frame (S102: Yes), the determination unit 142 proceeds to S103. When the frame input unit 110 does not acquire a new input frame (S102: No), the determination unit 142 repeats S102 until the frame input unit 110 acquires a new input frame.

When the frame input unit 110 acquires a new input frame (S102: Yes), the buffering control unit 141 performs the "normal reproduction control" for outputting video at a normal reproduction speed to an external device (S103).

Specifically, the buffering control unit 141 sets a block indicated by the write pointer WP as a recording block. Thereafter, the buffering control unit 141 adds 1 to the address number stored in the write pointer WP. The buffering control unit 141 then sets a block indicated by the write pointer WP as in-write block, and controls the frame input unit 110 to write an input frame into the block indicated by the write pointer WP.

In the example of FIG. 7, the buffering control unit 141 sets the block 9 as a recording block to be the address number "10." Then, the buffering control unit 141 sets the block 10 as in-write block, and writes an input frame into the block 10.

Further, the buffering control unit 141 controls the read unit 131 to read the input frame from a block indicated by the read pointer RP. Thereafter, the buffering control unit 141 sets a block indicated by the read point RP as open block, and adds 1 to the address number stored in the read pointer RP.

In the example of FIG. 7, the buffering control unit 141 reads the input frame from the block 4. Then, the buffering control unit 141 sets the block 4 as open block to be the address number "5."

The frame interpolation unit 130 generates a normal reproduction signal based on the input frames read by the read unit 131 to be output to a liquid crystal display or the like. At this time, the frame interpolation unit 130 may insert an interpolated frame between the input frames.

When completing the normal reproduction control, the control unit 140 returns to S102 to wait for the frame input unit 110 to acquire a new input frame.

The slow reproduction processing will be described below.

Figure 8:
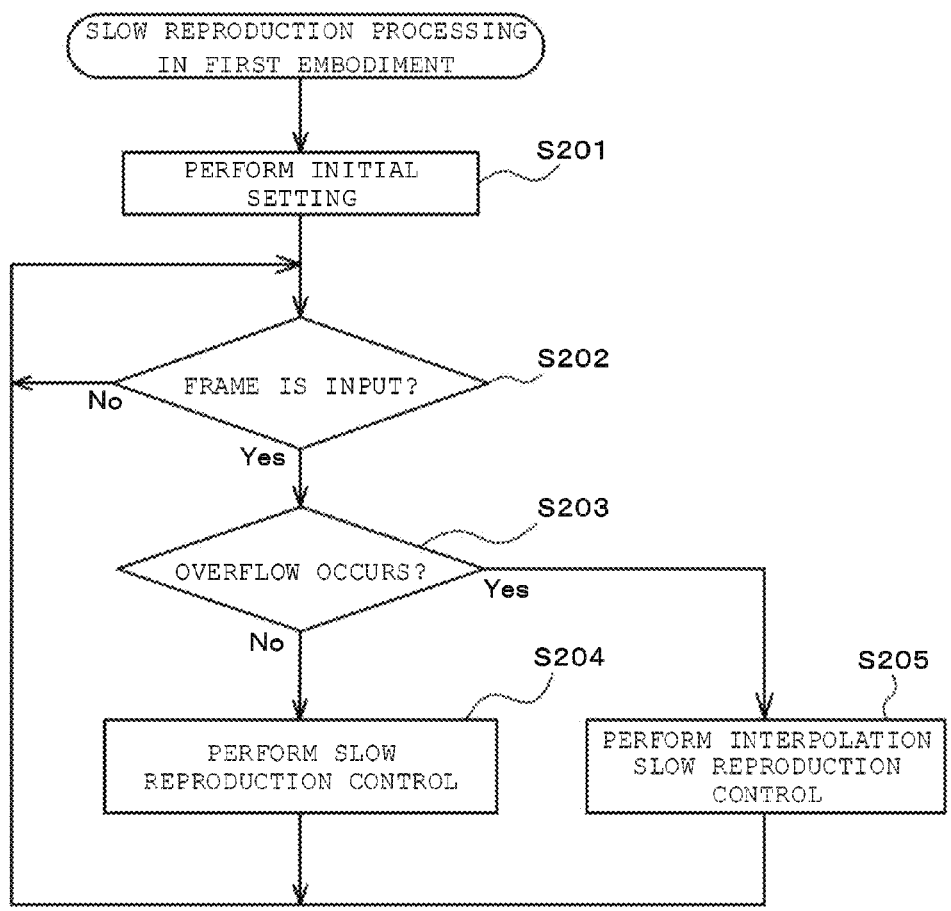
FIG. 8 is a flowchart illustrating slow reproduction processing according to the first embodiment.

When receiving a slow reproduction control signal from an external device, the control unit 140 starts the slow reproduction processing. The "slow reproduction processing" is directed for outputting slowly-reproduced video on a liquid crystal display or the like. FIG. 8 is a flowchart illustrating the slow reproduction processing.

The buffering control unit 141 performs initial setting based on a buffering situation of the frame buffer 120 (S201). S201 is similar to S101, and thus the description thereof will be omitted.

Subsequently, the determination unit 142 determines whether the frame input unit 110 acquires a new input frame (S202). When the frame input unit 110 acquires a new input frame (S202: Yes), the determination unit 142 proceeds to S203. When the frame input unit 110 does not acquire a new input frame (S202: No), the determination unit 142 repeats S202 until the frame input unit 110 acquires a new input frame.

Figure 9:
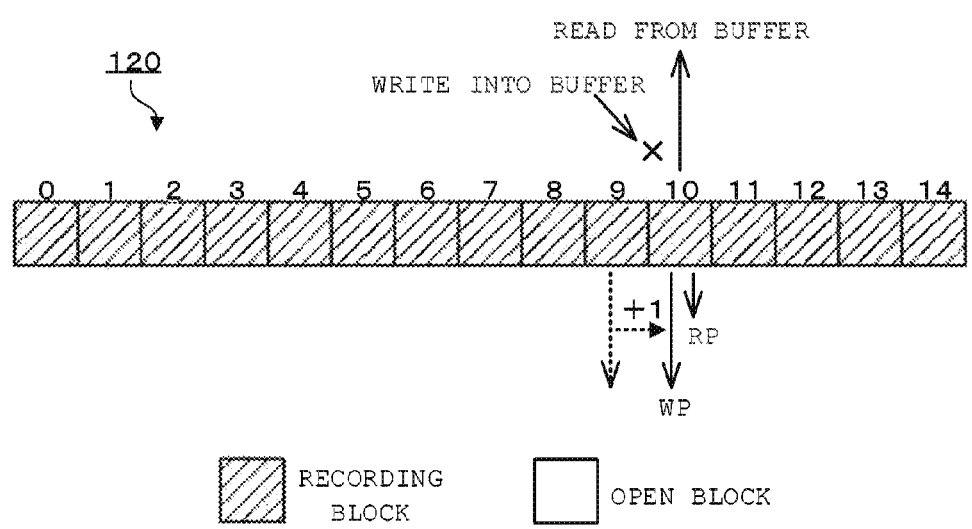
FIG. 9 is a diagram illustrating how the frame buffer overflows.

When the frame input unit 110 acquires a new input frame (S202: Yes), the determination unit 142 determines whether the frame buffer 120 overflows (S203). Overflow indicates that no blocks for recording new video information therein are present in the buffer. FIG. 9 is a diagram illustrating how the frame buffer overflows. The example of FIG. 9 illustrates that no open block is present, and the read pointer RP and the write pointer WP overlap with each other at the address number 10, which causes an overflow. For stream data input, the video information keeps being input at ix speed irrespective of a video reproduction speed. The buffer capacity cannot be unlimitedly increased, and thus non-open blocks will not be present due to continued slow reproduction. Any method for determining an overflow occurrence is possible, and for example, when the write pointer WP matches with the read pointer RP or when no open blocks are present in the buffer, the determination unit 142 may determine that an overflow occurs.

When an overflow does not occur (S203: No), the buffering control unit 141 performs "slow reproduction control" for outputting slowly-reproduced video on a liquid crystal display or the like (S204).

Specifically, the buffering control unit 141 sets a block indicated by the write pointer WP as a recording block. Then, the buffering control unit 141 adds 1 to the address number stored in the write pointer WP. Thereafter, the buffering control unit 141 sets a block indicated by the write pointer WP as in-write block, and controls the frame input unit 110 to write an input frame into the block indicated by the write pointer WP.

The buffering control unit 141 adds a decimal number depending on a slow reproduction speed to the address number stored in the read pointer RP. For example, when the slow reproduction speed is a quarter of the normal reproduction speed, 0.25 (=¼) is added to the read pointe RP. Then, when the read pointer RP is an integer, the buffering control unit 141 controls the read unit 131 to read the input frame from the block indicated by the read pointer RP, and sets the block indicated by the read pointer RP as open block. Then, the frame interpolation unit 130 generates a slow reproduction signal based on the read input frame. When the read pointer RP is not an integer, the frame interpolation unit 130 generates an interpolated frame with the decimal number (0.25, for example) of the read pointer RP as an interpolation offset value offs. Then, the frame interpolation unit 130 inserts the generated interpolated frame between the input frames. The frame interpolation unit 130 transmits the generated slow reproduction signal to an external device.

When an overflow occurs (S203: Yes), the buffering control unit 141 performs interpolation slow reproduction control (S205). The interpolation slow reproduction control is to continue to buffer input frames in a different way from the slow reproduction control indicated in S204, thereby to continue slow reproduction.

Figure 10:
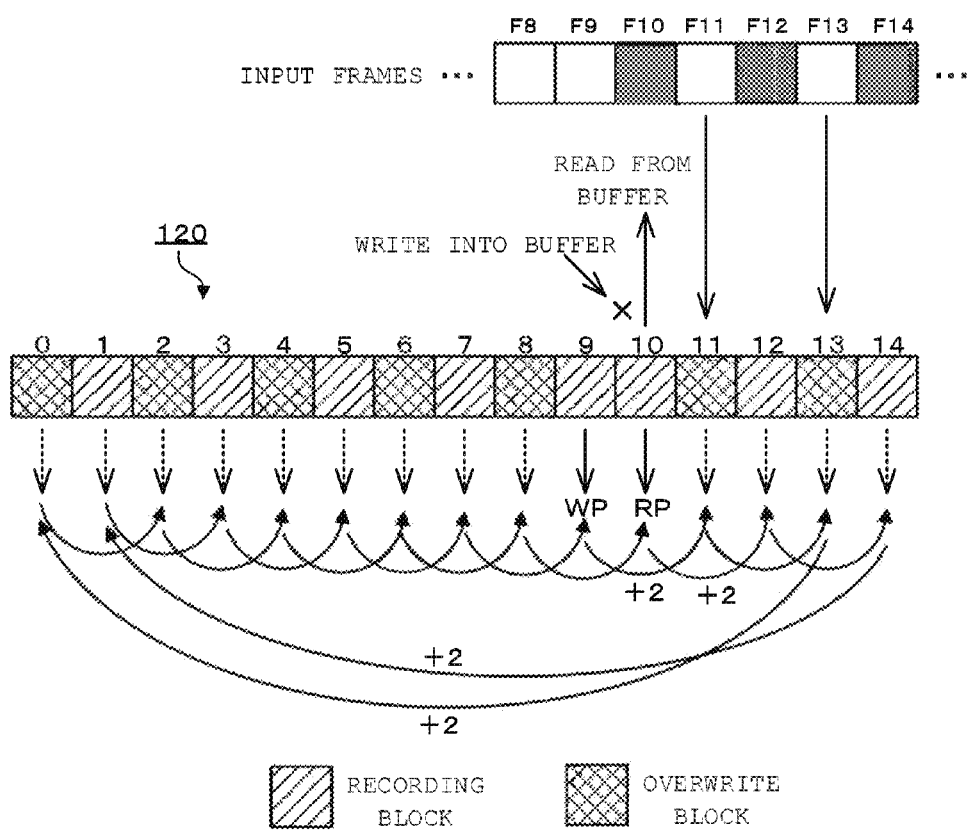
FIG. 10 is a diagram illustrating how the frame buffer buffers when an overflow occurs.

FIG. 10 is a diagram illustrating how the frame buffer buffers when an overflow occurs. The buffering control unit 141 writes input frames while incrementing the write pointer WP by 2. That is, the buffering control unit 141 writes input frames in the overwrite blocks selected every other block. In the example of FIG. 10, since an overflow occurs at the address number 10, the buffering control unit 141 sets the write pointer WP in the order of 11, 13, 0, 2, 4, 6, 8, 10, 12, 14, 1, 3, 5, . . . , and writes the input frames therein.

At this time, the buffering control unit 141 writes the input frames into the frame buffer 120 every other frame. In the example of FIG. 10, the buffering control unit 141 thins out the frames F10, F12, F14, . . . , and overwrites the frames F11, F13, . . . in the overwrite blocks.

The buffering control unit 141 then reads the input frames from the buffer while incrementing the read pointer RP by 2. When the read pointer RP or the write pointer WP are advanced by 2, odd numbers of blocks in the frame buffer 120 are assumed. When the pointer turns around, the blocks through which the pointer advances are automatically switched from the recording blocks to the overwrite blocks or from the overwrite blocks to the recording blocks, which facilitates the processing.

In this case, the frame interpolation unit 130 recovers an overwritten and missing frame from the remaining non-overwritten frames. In the example of FIG. 10, the frame interpolation unit 130 recovers an input frame positioned at the block 11 from the two input frames recorded in the blocks 10 and 12. More specifically, the frame interpolation unit 130 generates an interpolated frame with an interpolation offset value offs of 0.5 assuming an inter-frame distance between the two input frames recorded in the blocks 10 and 12 as 1. The frame interpolation unit 130 then acquires the generated interpolated frame as an input frame positioned at the block 11. The interpolated frame generation method may be the same as the interpolated frame generation method on normal slow reproduction indicated in S204. In this case, a frame to be recovered may not be perfectly the same as the overwritten and missing frame.

The frame interpolation unit 130 recovers a thinned and missing input frame from the non-thinned and written input frames. In the example of FIG. 10, the frame interpolation unit 130 recovers an input frame positioned at F12 from the two input frames at F11 and F13. More specifically, the frame interpolation unit 130 generates an interpolated frame with an interpolation offset value offs of 0.5 assuming a distance between the two input frames at F11 and F13 as 1. The frame interpolation unit 130 then acquires the generated interpolated frame as an input frame position at F12. The interpolated frame generation method may be the same as the interpolated frame generation method on normal slow reproduction indicated in S204. In this case, a frame to be recovered may not be perfectly the same as the thinned and missing frame.

Further, the frame interpolation unit 130 generates an interpolated frame in order to realize smooth slowly-reproduced video. In the example of FIG. 10, the frame interpolation unit 130 generates a frame to be inserted between the blocks 10 and 11 or an interpolated frame to be inserted between F11 and F12. The interpolated frame generation method is the same as the interpolated frame generation method on normal slow reproduction indicated in S204. The frame interpolation unit 130 then inserts an interpolated frame thereby to generate a slow reproduction signal. The frame interpolation unit 130 transmits the generated slow reproduction signal to a liquid crystal display or the like.

When completing the slow reproduction control or the interpolation slow reproduction control, the control unit 140 returns to S202 to wait for the frame input unit 110 to acquire a new input frame.

The repeat slow reproduction processing will be described below.

Figure 11:
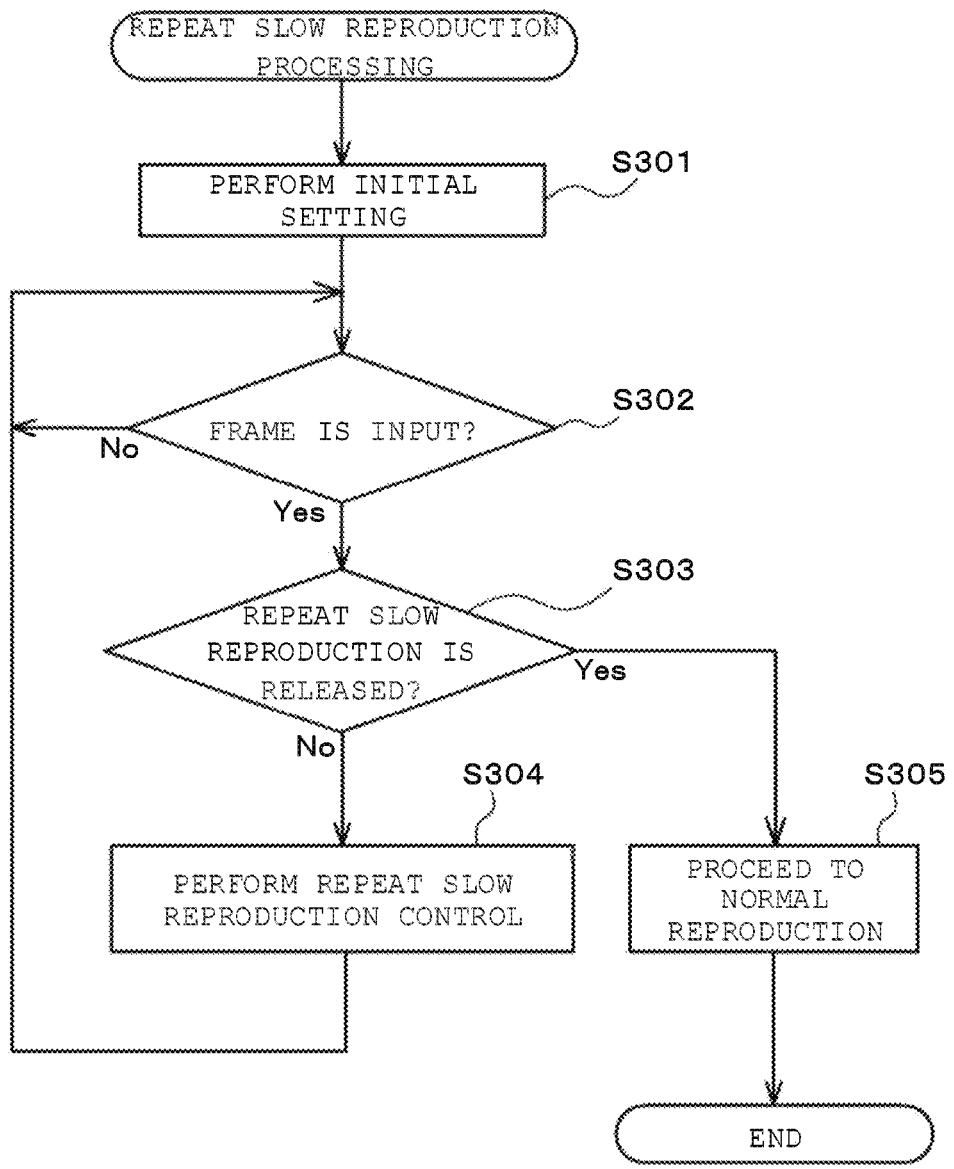
FIG. 11 is a flowchart illustrating repeat slow reproduction processing according to the embodiment.

When receiving a repeat slow reproduction control signal from an external device, the control unit 140 starts the repeat slow reproduction processing. The repeat slow reproduction processing is directed for repeatedly outputting the same slowly-reproduced video (slowly-reproduced video for several seconds to several tens of seconds, for example). FIG. 11 is a flowchart illustrating the slow reproduction processing.

Figure 12:
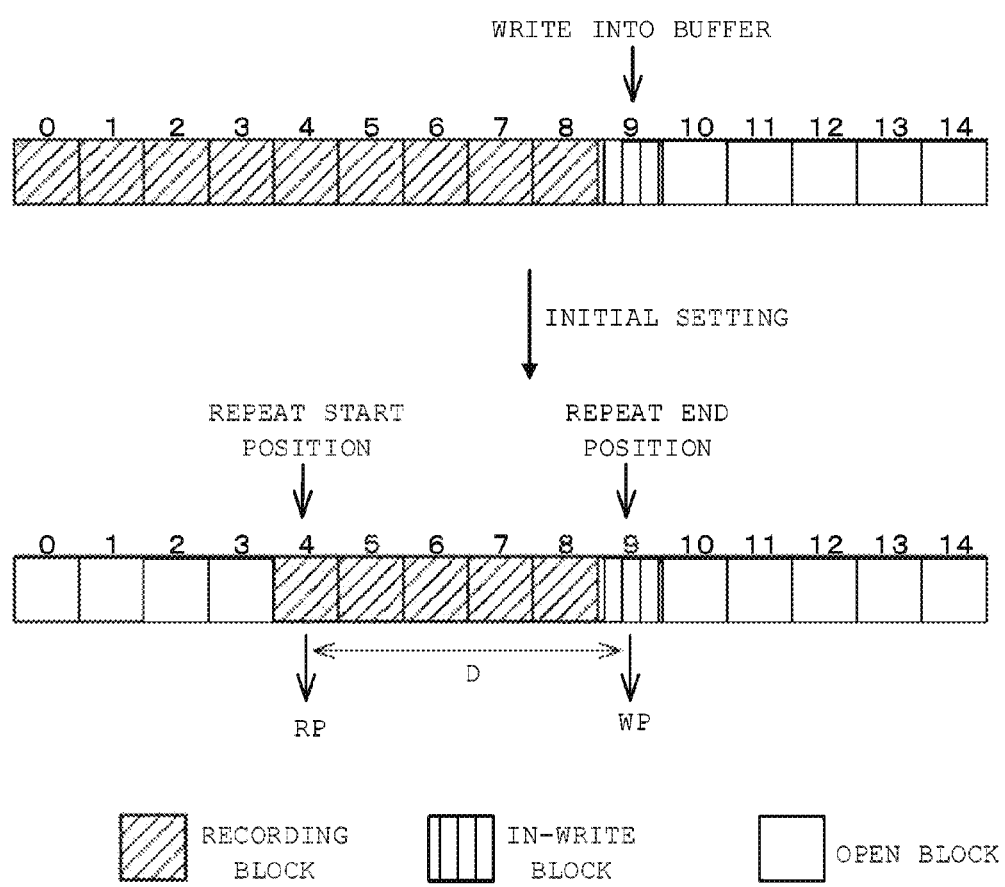
FIG. 12 is a diagram illustrating how the frame buffer is initialized on repeat slow reproduction.

The buffering control unit 141 performs initial setting based on a buffering situation of the frame buffer 120 (S301). FIG. 12 is a diagram illustrating how the frame buffer is initialized on repeat slow reproduction. For example, the frame input unit 110 is assumed to be writing an input frame in the block 9.

In this case, the buffering control unit 141 stores the address number "9" in the write pointer WP as internal variable, and sets the block 9 at the repeat end position. Further, the buffering control unit 141 stores the number of a block back from the in-write block by delay D in the read pointer RP, and sets the block at the repeat start position. In FIG. 12, the buffering control unit 141 stores the address number "4" in the read pointer RP. The buffering control unit 141 then sets the block indicated by the write pointer WP as "in-write block", the blocks from the write pointer WP−1 to the read pointer RP as "recording blocks", and other blocks as "open blocks." The delay D is for 5 blocks by way of example, but the delay D is actually for several seconds to several tens of seconds.

The determination unit 142 determines whether the frame input unit 110 acquires a new input frame (S302). When the frame input unit 110 acquires a new input frame (S302: Yes), the determination unit 142 determines whether the repeat slow reproduction is released by the control signal (S303). When the frame input unit 110 does not acquire a new input frame (S302: No), the determination unit 142 repeats S302 until the frame input unit 110 acquires a new input frame.

When the repeat slow reproduction is not released (S303: No), the buffering control unit 141 performs the "repeat slow reproduction control" for outputting repeatedly slowly-reproduced video to an external device (S304).

Figure 13:
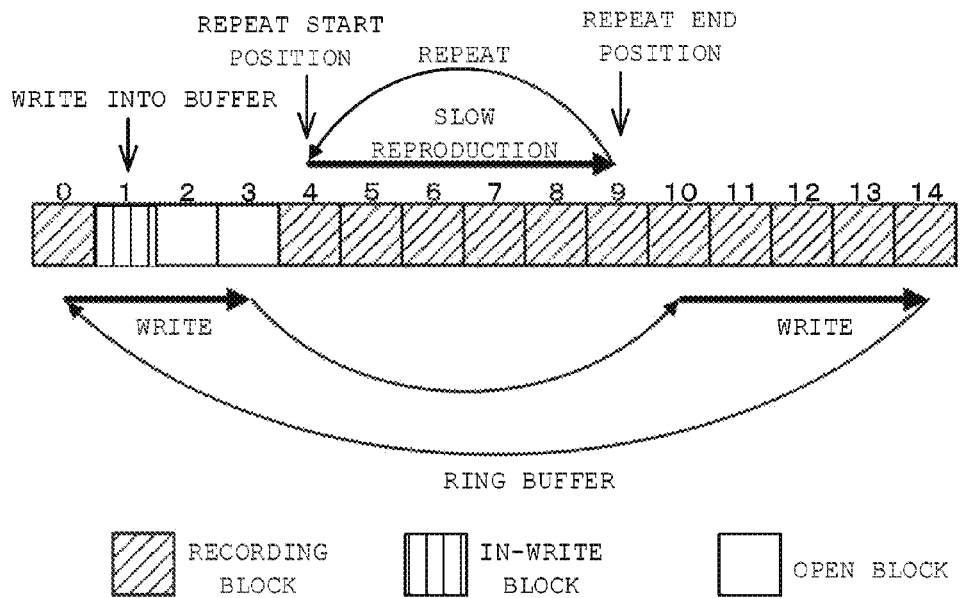
FIG. 13 is a diagram illustrating how the frame buffer buffers on repeat slow reproduction.

Specifically, the buffering control unit 141 controls the read unit 131 thereby to repeatedly read the input frames from the repeat start position to the repeat end position. For example, as illustrated in FIG. 13, assuming the repeat start position at the address number 4 and the repeat end position at the address number 9, the buffering control unit 141 repeatedly reads the blocks with the address numbers 4 to 9. The frame interpolation unit 130 then generates a slow reproduction signal based on the read input frames to be output to a liquid crystal display or the like.

The buffering control unit 141 controls the frame input unit 110 to write newly-acquired input frames in blocks not used for the repeat slow reproduction. At this time, the buffering control unit 141 assumes the blocks not used for the repeat slow reproduction as a ring buffer, and continues to write input frames. When the ring buffer turns around, the input frames are overwritten in the blocks into which the input frames are already written. In the example of FIG. 13, the address numbers 10 to 14 and 0 to 3 are assumed as a ring buffer.

Figure 14:
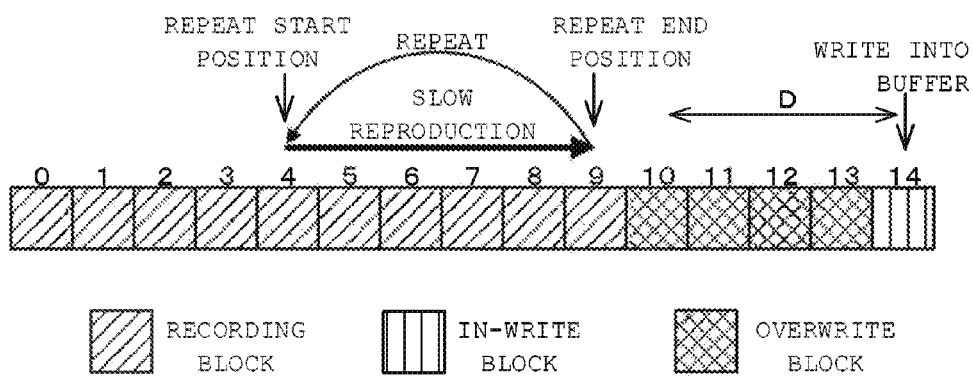
FIG. 14 is a diagram illustrating how the frame buffer is overwritten on repeat slow reproduction.

When the repeat slow reproduction is released (S303: Yes), the reproduction control unit 143 stops the repeat slow reproduction and causes the image output device 100 to proceed to normal reproduction (S305). When proceeding to the normal reproduction processing, the image output device 100 starts the normal reproduction from a position which is back from the current in-write block by delay D. For example, assuming the delay D with 4 blocks and the current in-write block as the block 14, the image output device 100 starts the normal reproduction from the block with the address number 10 as illustrated in FIG. 14. Further, the buffering control unit 141 returns the ring buffer to the original, and enables the blocks used for slow reproduction to be overwritten.

According to the present embodiment, the image output device 100 overwrites input frames every other block when an overflow occurs. Even if an overflow occurs, the image output device 100 according to the present embodiment can continue to write in the buffer for a while. Consequently, the image output device 100 can reduce the processing such as stopping the slow reproduction due to a lacking buffer capacity, thereby reducing unusual behavior.

Further, the image output device 100 recovers the overwritten and missing frames by frame interpolation. Therefore, even if a frame disappears due to overwrite, slowly-reproduced video is not unusual. Additionally the frame interpolation processing of recovering a missing frame uses the frame interpolation processing used for slowly-reproduced video, and thus can be realized in simple processing.

When an overflow occurs, the image output device 100 thins out input frames every other block, and thus can continue to write in the buffer for a longer time. Additionally, the image output device 100 recovers the thinned and missing input frames by frame interpolation, and thus slowly-reproduced video is not unusual. Additionally, the image output device 100 can realize the processing of interpolating thinned and missing input frames and the processing of interpolating overwritten and missing input frames in the same processing method.

The image output device 100 continues to write input frames with a storage area not used for repeat slow reproduction as a ring buffer. Even when the user releases the slow reproduction and instructs the normal reproduction, the image output device 100 according to the present embodiment can immediately output the latest frames to a liquid crystal display. Therefore, even if an overflow occurs, the image output device 100 cannot cause an unusually heavy weight during slow reproduction release.

Second Embodiment

In a second embodiment, when an overflow occurs, the write pointer WP is fixed, and input frames continue to be written into one block. An image output device 100 according to the second embodiment will be described below.

The image output device 100 according to the second embodiment is configured similarly to the image output device 100 according to the first embodiment, and thus the description thereof will be omitted. The operations of the image output device 100 according to the second embodiment is the same as the first embodiment except the slow reproduction processing, and thus the operations of other than the slow reproduction processing will be omitted. The slow reproduction processing according to the second embodiment will be described below.

Figure 16:
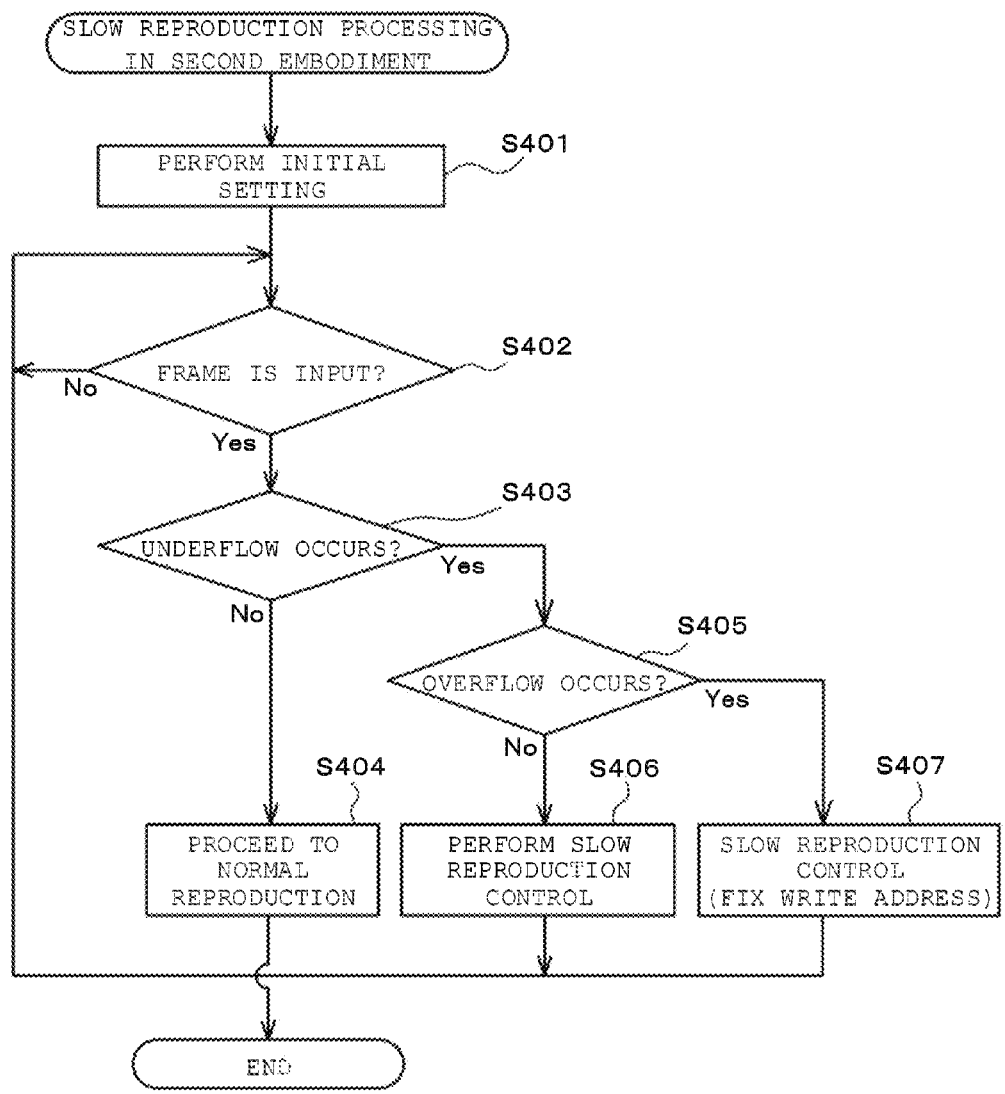
FIG. 16 is a flowchart illustrating slow reproduction processing according to a second embodiment.

When receiving a slow reproduction control signal from an external device, a control unit 140 starts the slow reproduction processing. The slow reproduction processing will be described below with reference to the flowchart of FIG. 16.

A buffering control unit 141 performs initial setting based on a buffering situation of a frame buffer 120 (S401). S401 is similar to S101 according to the first embodiment.

Subsequently, a determination unit 142 determines whether a frame input unit 110 acquires a new input frame (S402). When the frame input unit 110 acquires a new input frame (S402: Yes), the determination unit 142 proceeds to S403. When the frame input unit 110 does not acquire a new input frame (S402: No), the determination unit 142 repeats S402 until the frame input unit 110 acquires a new input frame.

Figure 15:
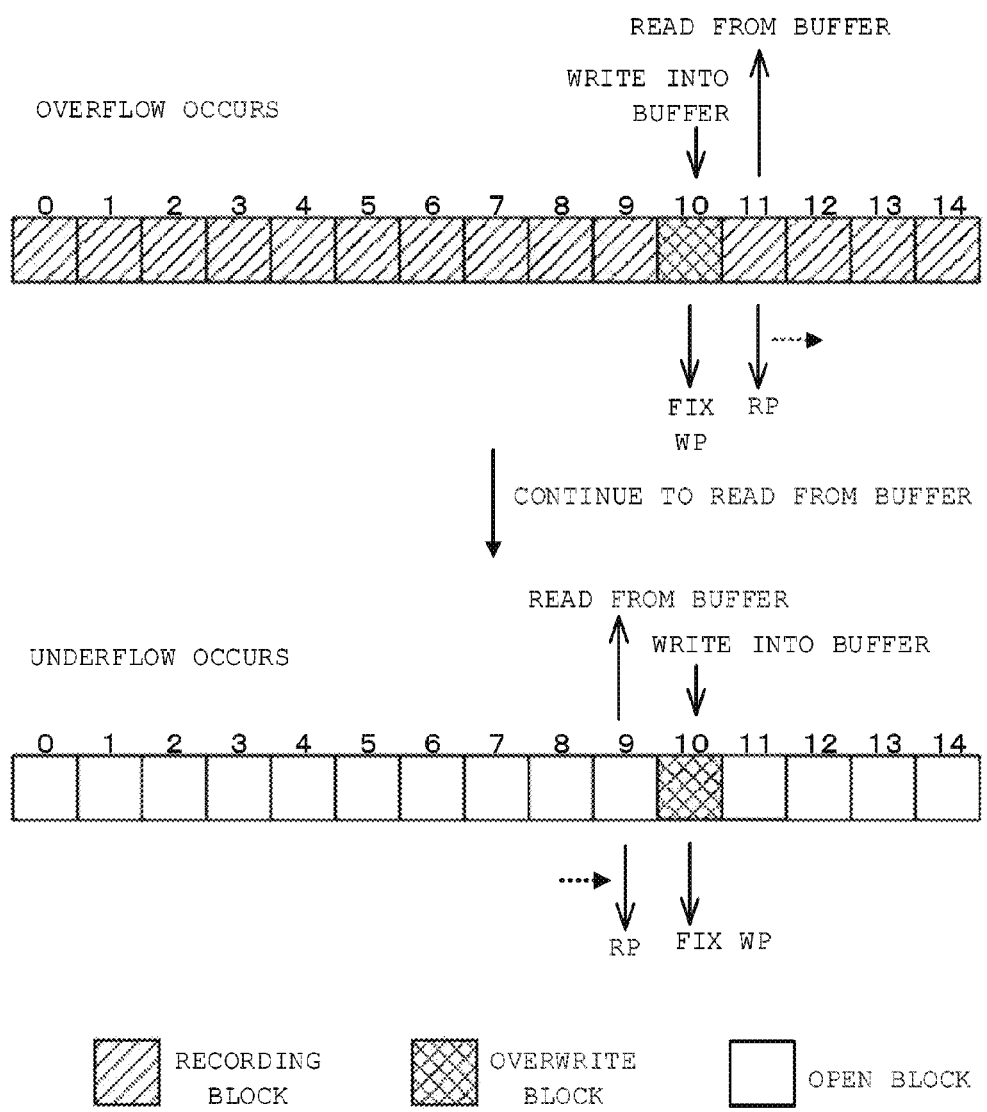
FIG. 15 is a diagram illustrating how an underflow occurs in the frame buffer after an overflow occurs.

When the frame input unit 110 acquires a new input frame (S402: Yes), the determination unit 142 determines whether an underflow occurs in the frame buffer 120 (S403). The underflow is that the buffer read position reaches the buffer write position due to continued buffer reading after an overflow occurs. FIG. 15 is a diagram illustrating how an underflow occurs in the frame buffer after an overflow occurs. FIG. 15 illustrates a state (underflow) in which the buffer reading turns around after an overflow occurs, and the read pointer RP finally reaches the write pointer WP. Any underflow occurrence determination method is possible, and for example, when the read pointer RP matches with the write pointer WP after an overflow occurs or when all the blocks other than the overwrite blocks are open blocks after an overflow occurs, the determination unit 142 may determine that an underflow occurs.

When an underflow does not occur (S403: No), the determination unit 142 proceeds to S404. When an underflow occurs (S403: Yes), the determination unit 142 proceeds to S405.

When an underflow does not occur (S403: No), a reproduction control unit 143 stops the slow reproduction and causes the image output device 100 to proceed to the normal reproduction (S404). Specifically, the reproduction control unit 143 causes the control unit 140 to start the normal reproduction processing illustrated in FIG. 6, and terminates the slow reproduction processing.

When an underflow occurs (S403: Yes), the determination unit 142 determines whether the frame buffer 120 overflows (S405).

When an overflow does not occur (S405: No), the buffering control unit 141 performs the "slow reproduction control" for outputting slowly-reproduced video on a liquid crystal display or the like (S406). S406 is similar to S204 according to the first embodiment.

When an overflow occurs (S405: Yes), the buffering control unit 141 fixes the write pointer WP, and continues to write input frames into one block (S407). For example, a buffering control unit 141 fixes the write pointer WP at the block 10, and continues to write input frames into the block 10 as illustrated in FIG. 15. At this time, the buffering control unit 141 writes the input frames without thinning. The buffer reading is continued similarly to the normal slow reproduction control indicated in S204. When completing the buffer reading and buffer writing, the control unit 140 returns to S402 to wait for the frame input unit 110 to acquire a new input frame.

According to the present embodiment, the image output device 100 continues to write the latest input frames into one block after an overflow occurs. Even if the user releases the slow reproduction and instructs the normal reproduction after an overflow occurs, the image output device 100 according to the present embodiment can rapidly output the latest frames to a liquid crystal display. Therefore, even if an overflow occurs, the image output device 100 cannot cause an unusually heavy weight on slow reproduction release.

Third Embodiment

Figure 17:
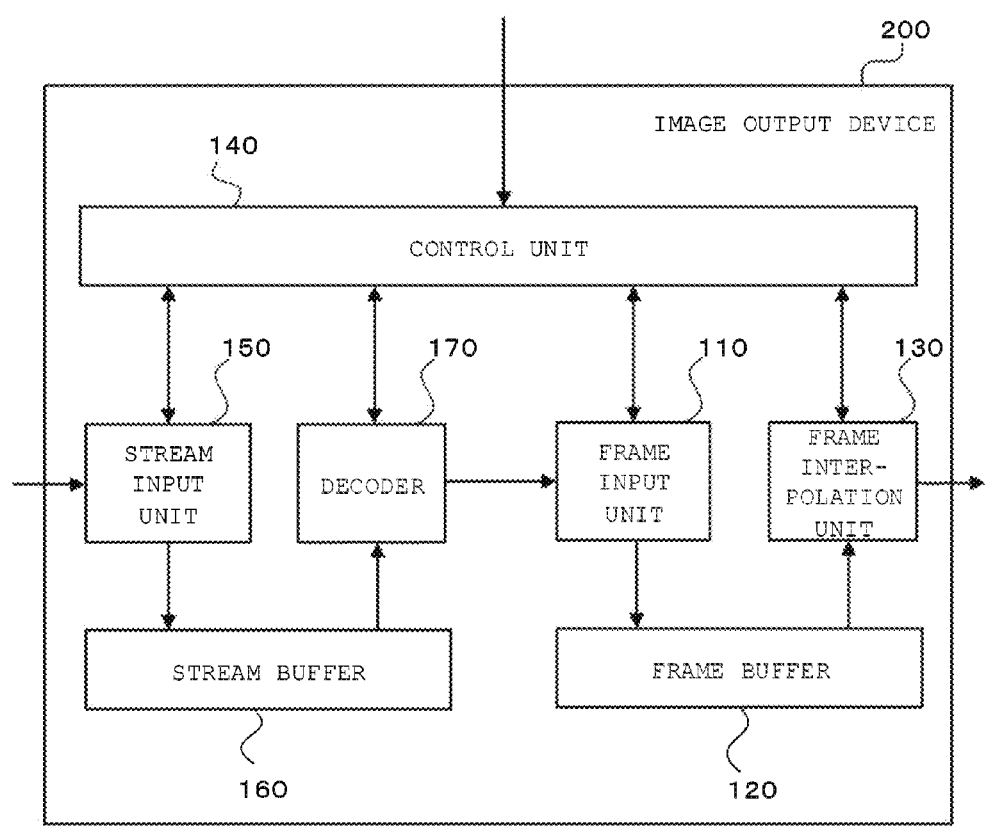
FIG. 17 is a block diagram of an image output device according to a third embodiment.

Video information input into the image output device 100 may be compressed on transmission. "Being compressed on transmission" is compression performed on video information when the video information is transmitted on radio waves or over a network. The compression encoding system may include MPEG (Moving Picture Experts Group)-2, MPEG-4 AVC (MPEG-4 Part 10 Advanced Video Coding)/H.264, and the like, An image output device 200 according to a third embodiment is a TV for outputting broadcast data transmitted on radio waves on a display, for example. FIG. 17 is a block diagram of the image output device according to the third embodiment. The same parts as the image output device 100 according to the first embodiment are denoted with the same reference numerals, and thus the description thereof will be omitted. The image output device 200 includes a frame input unit 110, a frame buffer 120, a frame interpolation unit 130, a control unit 140, a stream input unit 150, a stream buffer 160, and a decoder 170.

The stream input unit 150 is configured of a communication interface, or an input interface such as tuner. Video information to be input into the stream input unit 150 is compressed on transmission in MPEG-2, MPEG-4 AVC/H.264, or the like. The video information is configured of I frames (Intra-coded Frame), P frames (Predicted Frame), and B frames (Bi-directional Predicted Frame). The stream input unit 150 writes the acquired video information in the stream buffer 160.

The stream buffer 160 is a ring buffer configured of a storage device such as DRAM or SRAM. When acquiring video information, the frame input unit 110 writes the video information into the stream buffer 160 with one frame per block. The written frames are read by the decoder 170.

The decoder 170 is configured of a processing device such as processor. The decoder 170 functions as a decoder unit for expanding the video information compressed on transmission, and additionally functions as a read unit for reading the input frames from the buffer. The decoder 170 expands the read input frames and transmits the expanded input frames to the frame input unit 110.

The control unit 140 is configured of a processing device such as processor. When receiving a control signal from the outside, the control unit 140 performs the "normal reproduction processing", the "slow reproduction processing", or the "repeat reproduction processing." The control unit 140 functions as a buffering control unit 141, a determination unit 142, and a reproduction control unit 143. The control unit 140 makes buffer management not in the frame buffer 120 but in the stream buffer 160.

For example, in the slow reproduction processing, when the stream buffer 160 overflows, the control unit 140 overwrites newly-acquired input frames in the recording blocks similarly to the slow reproduction processing according to the first embodiment.

Specifically, the determination unit 142 determines whether the stream buffer 160 overflows. For example, when no open blocks are left in the stream buffer 160, the determination unit 142 may determine that an overflow occurs.

Figure 18:
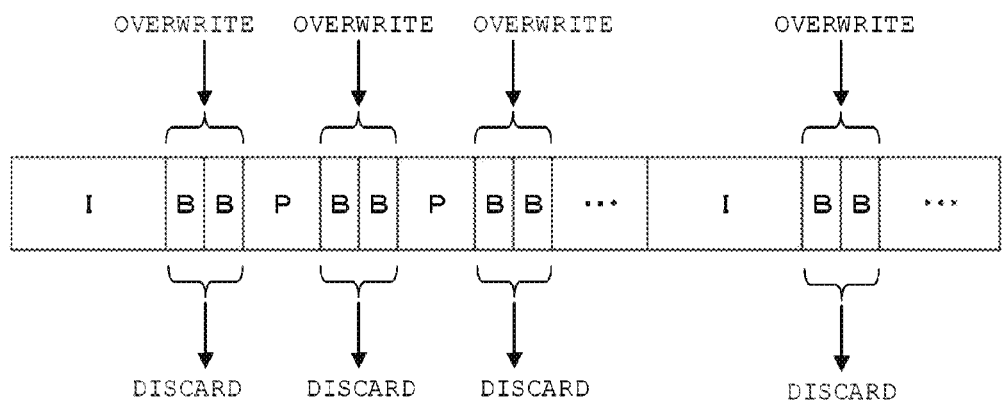
FIG. 18 is a diagram illustrating how input frames are overwritten on B frames.

When an overflow occurs, the buffering control unit 141 overwrites new input frames in the recording blocks. At this time, the buffering control unit 141 selects the B frames as overwrite blocks from the stream buffer 160, and overwrites the newly-acquired input frames therein. FIG. 18 is a diagram illustrating how input frames are overwritten in the B frames. The B frames may be thinned out from the video information to be overwritten. The overwritten and missing B frames or the thinned and missing B frames are recovered by the frame interpolation unit 130.

Figure 19:
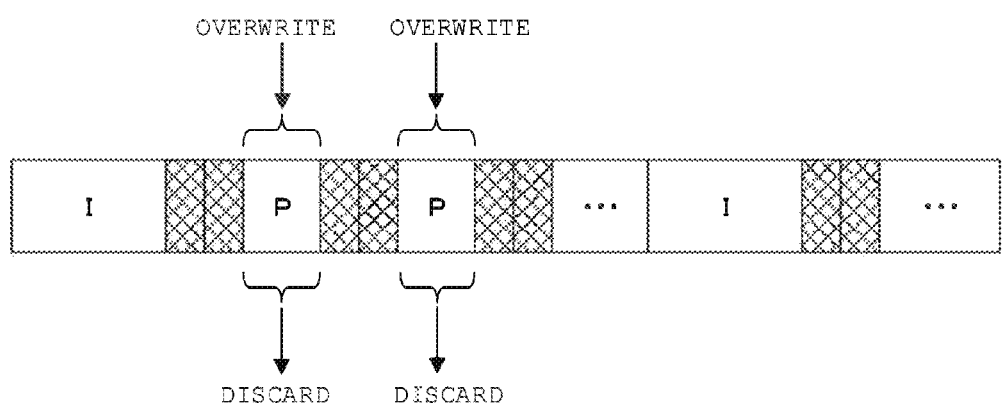
FIG. 19 is a diagram illustrating how input frames are overwritten on P frames.

Further, when all the B frames are overwritten, the buffering control unit 141 may overwrite input frames in the P frames. FIG. 19 is a diagram illustrating how input frames are overwritten in the P frames. At this time, the B frames and P frames may be thinned out from the video information to be overwritten. The overwritten and missing B frames and P frames and the thinned and missing B frames and P frames are recovered by the frame interpolation unit 130.

When the stream buffer 160 overflows, the control unit 140 may continue to overwrite newly-acquired input frames in specific blocks similarly to the slow reproduction processing according to the second embodiment. At this time, the buffering control unit 141 may continue to overwrite video information in units of GOP (Group Of Pictures) in the overwrite blocks with a capacity of the overwrite blocks for 1 GOP. The GOP is a collection of frames between the I frames.

According to the present embodiment, the image output device 200 performs buffering control by use of video information compressed on transmission, and thus can maintain the buffering on slow reproduction longer.

Fourth Embodiment

Figure 20:
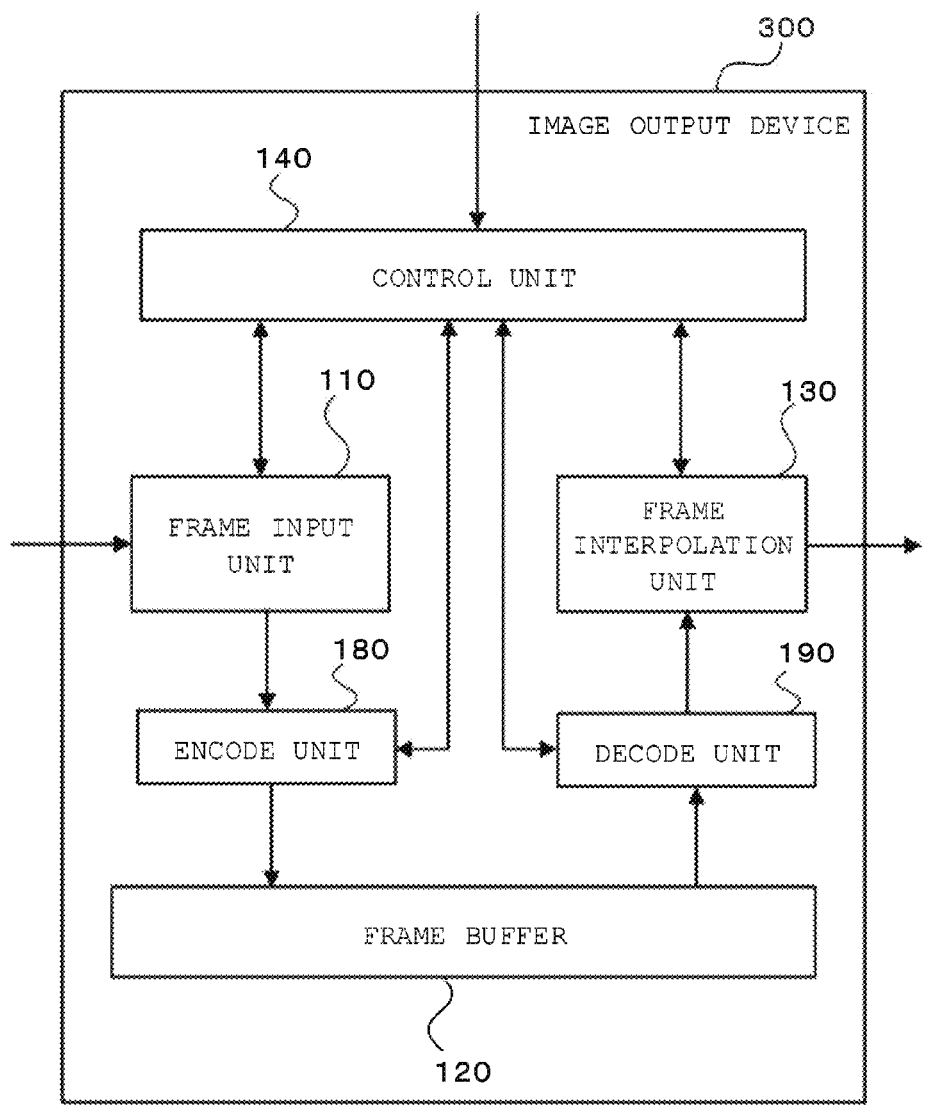
FIG. 20 is a block diagram of an image output device according to a fourth embodiment.

An image output device according to a fourth embodiment compresses input frames and writes them in a frame buffer 120. FIG. 20 is a block diagram of the image output device according to the fourth embodiment. The same parts as the image output device 100 according to the first embodiment are denoted with the same reference numerals, and thus the description thereof will be omitted. An image output device 300 includes a frame input unit 110, the frame buffer 120, a frame interpolation unit 130, a control unit 140, an encode unit 180, and a decode unit 190.

The encode unit 180 is configured of a processing device such as processor. The encode unit 180 compresses the input frames received from the frame input unit 110 at a compression rate instructed by the control unit 140. At this time, the encode unit 180 compresses the input frames in units of frame. The compression encoding method may be MPEG-4 AVC/H.264, HEVC (High Efficiency Video Coding), JPEG (Joint Photographic Experts Group) 2000, or the like. The encode unit 180 writes the compressed input frames (which will be called "compressed frames" below) in the frame buffer 120 under control of the control unit 140.

The decode unit 190 is configured of a processing device such as processor. The decode unit 190 reads the compressed frames from the frame buffer 120 under control of the control unit 140. The decode unit 190 then expands and transmits the compressed frames to the frame interpolation unit 130.

According to the present embodiment, the image output device 300 writes the compressed frames in the frame buffer 120. The image output device according to the fourth embodiment can continue to buffer the input frames for a long time, and can continue the slow reproduction even if an overflow occurs.

Fifth Embodiment

Figure 21:
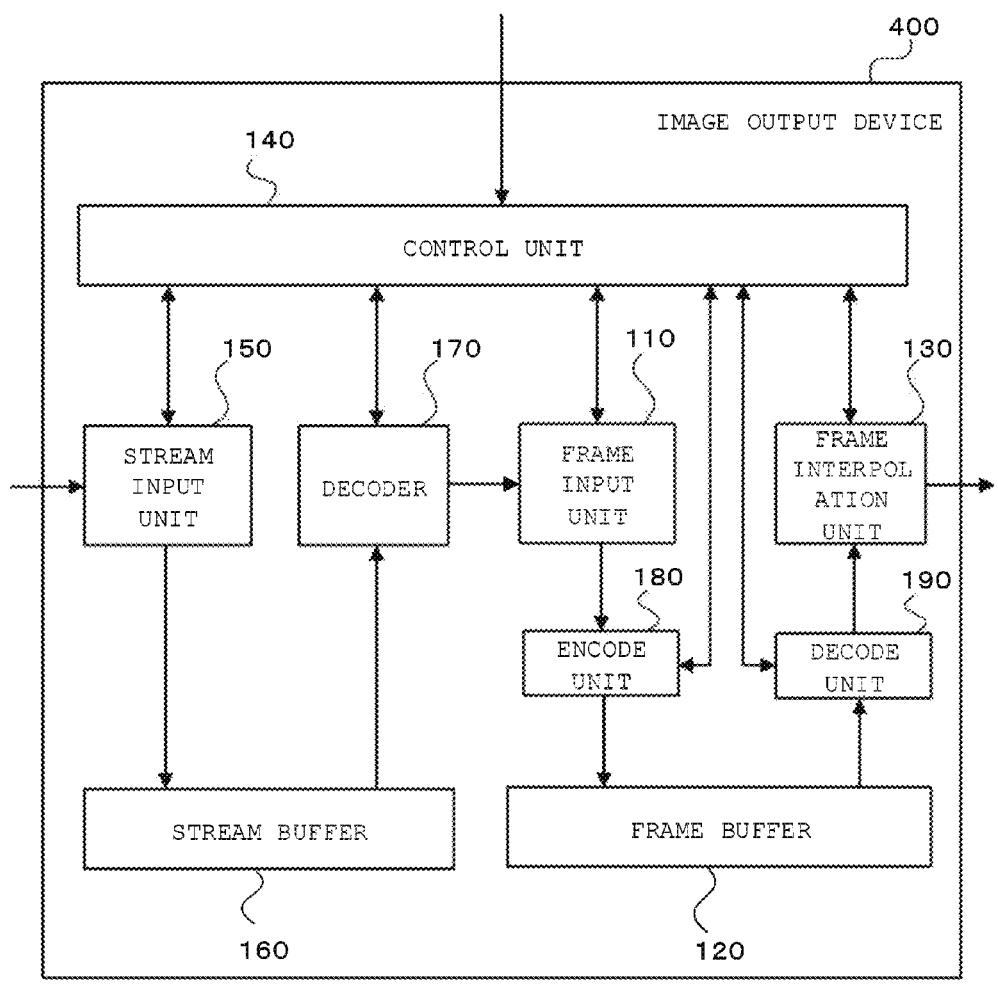
FIG. 21 is a block diagram of an image output device according to a fifth embodiment.

An image output device according to a fifth embodiment compresses and writes input frames in a frame buffer 120 similarly to the fourth embodiment. FIG. 21 is a block diagram of the image output device according to the fifth embodiment. The same parts as the image output devices according to the third embodiment and the fourth embodiment are denoted with the same reference numerals, and thus the description thereof will be omitted. An image output device 400 includes a frame input unit 110, the frame buffer 120, a frame interpolation unit 130, a control unit 140, a stream input unit 150, a stream buffer 160, a decoder 170, an encode unit 180, and a decode unit 190.

The structures of the image output device 400 are the same as the third embodiment except that the frame input unit 110 writes input frames in the frame buffer 120 via the encode unit 180 and the frame interpolation unit 130 reads the input frames from the frame buffer 120 via the decode unit 190. The structures of the encode unit 180 and the decode unit 190 are the same as the fourth embodiment.

According to the present embodiment, the image output device 400 is configured to write compressed frames in the frame buffer 120. The image output device according to the fifth embodiment can continue to buffer input frames for a long time and can continue the slow reproduction even if an overflow occurs.

Each embodiment described above is exemplary, and various modifications and applications are possible.

Figure 22:
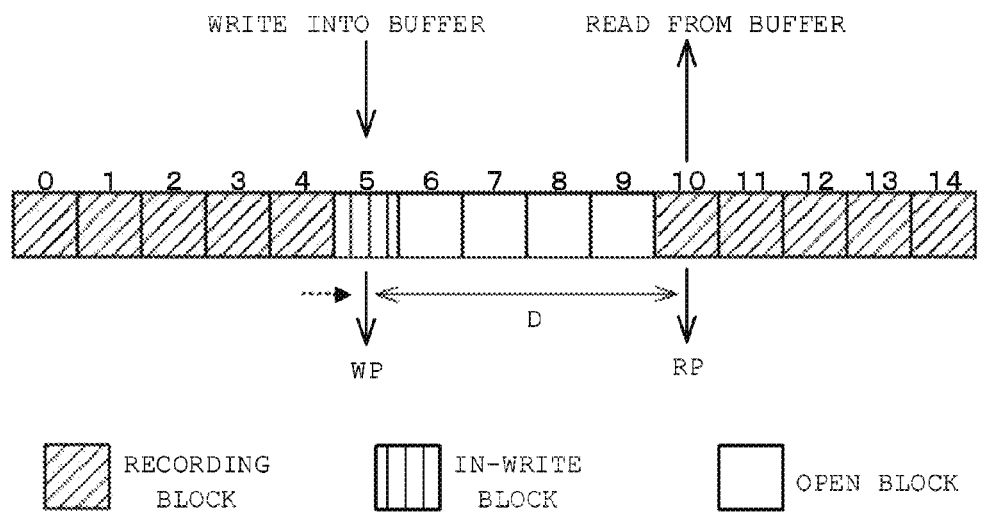
FIG. 22 is a diagram illustrating how an overflow occurs.

For example, in each embodiment described above, a determination unit 142 determines that an overflow occurs when the buffer is filled with the recording blocks and no blocks for recording new video information therein are present, but the determination unit 142 may determine that an overflow occurs a certain period of time before the buffer is filled with the recording blocks. For example, as illustrated in FIG. 22, when the distance between a block indicated by the write pointer WP and a block indicated by the read pointer RP is D or less (5 blocks or less, for example), the determination unit 142 may determine that an overflow occurs.

There has been described, in the second embodiment, that a buffering control unit 141 continues to overwrite input frames into a specific block after an overflow occurs, but one block does not necessarily continue to be overwritten. The buffering control unit 141 selects a plurality of blocks as overwrite blocks, and may continue to overwrite input frames in the selected overwrite blocks. In this case, the buffering control unit 141 may assume the overwrite blocks as a ring buffer.

Figure 23:
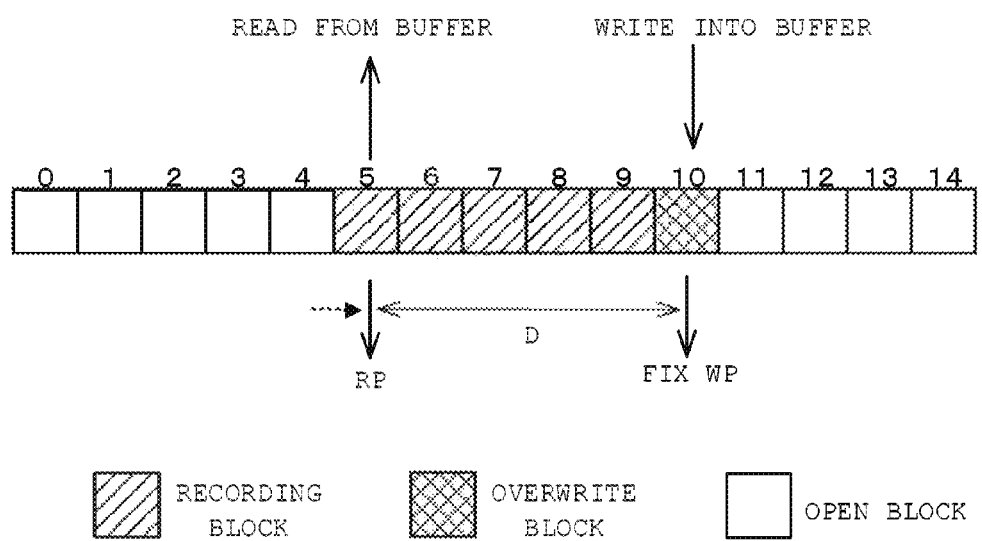
FIG. 23 is a diagram illustrating how an underflow occurs.

According to the second embodiment, the determination unit 142 determines that an underflow occurs when the buffer read position reaches the buffer write position after an overflow occurs, but the determination unit 142 may determine that an underflow occurs a certain period of time before the buffer read position reaches the buffer write position. For example, as illustrated in FIG. 23, when the distance between a block indicated by the read pointer RP and a block indicated by the write pointer WP is D or less (5 blocks or less, for example), the determination unit 142 may determine that an underflow occurs.

In each embodiment described above, the description has been made assuming that the size of one block is as large as one frame can be stored, but the size of one block may be as large as a plurality of frames can be stored (the size at which 1 GOP can be stored, for example). In this case, the frame input unit 110 or the stream input unit 150 may write input frames in the buffer in units of frames (in units of GOP, for example) corresponding to the block size.

In each embodiment described above, the description has been made assuming that video information input in stream data into the image output devices 100 to 400 is video data input via a communication cable or broadcast data transmitted on radio waves, but the video information is not limited to the data. For example, video information input in stream data into the image output devices 100 to 400 may be IP-transmitted video streams, or moving pictures shot by a shooting device and input into the devices in real-time.

In the third and fifth embodiments, the description has been made assuming that video information input in stream data into the image output devices are compressed on transmission in MPEG-2 or MPEG-4 AVC/H.264, but the encoding system for compressing video information on transmission is not limited to MPEG-2 or MPEG-4 AVC/H.264. The encoding system for compression on transmission may be H.261, H.263, MPEG-1, and the like, for example.

In each embodiment described above, the image output device changes the buffering method and continues to buffer video information after the buffer overflows, but does not need to continue to buffer video information after the buffer overflows. For example, after the determination unit 142 detects that an overflow occurs, the reproduction control unit 143 may immediately stop the slow reproduction, and may cause the image output device to proceed to normal reproduction.

The image output devices 100 to 400 may be considered as completed products such as TV, player, recorder, personal computer, fixed-line phone, cell phone, Smartphone, tablet terminal, PDA (Personal Digital Assistant), and game player. The image output devices may be considered as components mounted on completed products, such as semiconductor and semiconductor substrate.

The image output devices according to the present embodiments may be realized in a dedicated system or in a typical computer system. For example, the image output devices may be configured by storing and distributing a program for performing the above operations in a computer readable recording medium such as optical disk, semiconductor memory, magnetic tape or flexible disk, and installing the program in a computer to perform the above processing. The program may be stored in a disk device provided in a server device on a network such as Internet, and downloaded into a computer. The above functions may be realized in cooperation with the OS (operating system) and application software. In this case, the parts other than the OS may be stored and distributed in a medium, and the parts other than the OS may be stored in a server device and downloaded in a computer.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and there equivalents are intended to cover such forms of modifications as would fall within the scope and sprit of the invention.

What is claimed is:

1. An image output device comprising:
   a buffer into which video information input in stream data is written per block;
   a determination unit configured to determine whether the buffer is in an overflow state due to slow reproduction;
   a buffering control unit configured to switch a buffering pattern of the video information based on a determination result of the determination unit;
   a read unit configured to read the video information from the buffer per block and to open the buffer per block; and
   a frame interpolation unit configured to generate an interpolated frame to be inserted between frames based on information on the frames included in the video information,
   wherein when the buffer is in an overflow state, the buffering control unit overwrites the newly-acquired video information in some blocks selected from the non-open blocks, and
   the frame interpolation unit acquires the interpolated frame generated based on information on the non-overwritten and left blocks as an overwritten and missing frame.

2. The image output device according to claim 1, wherein when the buffer is in an overflow state, the buffering control unit thins out partial information from the newly-acquired video information, and overwrites the video information with partial information thinned out into some blocks selected from the non-open blocks, and the frame interpolation unit acquires the interpolated frame generated based on the video information recorded in the buffer without being thinned out as a thinned and missing frame.

3. The image output device according to claim 1, wherein when the buffer is in an overflow state, the buffering control unit selects every other overwrite block from the non-open blocks, and overwrites the video information in the overwrite blocks.

4. The image output device according to claim 3, wherein when the buffer is in an overflow state, the buffering control unit thins out every other block from the newly-acquired video information, and overwrites the thinned video information in the overwrite blocks, and when the buffer is in an overflow state, the frame interpolation unit acquires the video information from the buffer every other block, and acquires an interpolated frame generated based on information on the acquired blocks as a frame positioned between blocks.

5. The image output device according to claim 3, wherein the buffering control unit is configured to use the buffer as a ring buffer, switches the buffering pattern and continues to buffer the video information after the buffer enters an overflow state, and determines that the buffer is in an underflow state when a distance between a block indicated by the write pointer and a block indicated by the read pointer is equal to or less than the preset number of blocks due to continued buffering after the buffer enters an overflow state.

6. The image output device according to claim 1, wherein the video information has B frames, P frames and I frames, the block is the B frame, the P frame or the I frame, when the buffer is in an overflow state, the buffering control unit selects at least either of blocks recording the B frames therein and blocks recording the P frames therein from the non-open blocks as overwrite blocks, and overwrites the video information in the overwrite blocks, and the frame interpolation unit acquires the interpolated frame generated based on information on the non-overwritten and left frames as an overwritten and missing frame.

7. The image output device according to claim 6, wherein when the buffer is in an overflow state, the buffering control unit thins out at least either of the B frames and the P frames from the newly-acquired video information, and overwrites the thinned video information in the overwrite blocks, and the frame interpolation unit acquires the interpolated frame generated based on information on the frames non-thinned and recorded in the buffer as a thinned and missing frame.

8. The image output device according to claim 7, wherein after all the blocks recording the B frames therein are overwritten in the buffer, the buffering control unit selects the P frames as the overwrite blocks.

9. The image output device according to claim 6, wherein after all the blocks recording the B frames therein are overwritten in the buffer, the buffering control unit selects the P frames as the overwrite blocks.

10. The image output device according to claim 1, wherein when the buffer is in an overflow state, the buffering control unit continues to overwrite the newly-acquired video information in one of the blocks.

11. The image output device according to claim 1, wherein when the buffer is in the overflow state, the buffering control unit selects a plurality of blocks from among blocks and continues to overwrite the newly-acquired video information into the selected blocks with the selected blocks as a ring buffer.

12. The image output device according to claim 1, comprising:

a reproduction control unit configured to stop the slow reproduction and to proceed to normal reproduction when the buffer is in an underflow state due to continued buffering after the buffer is in an overflow state.

13. The image output device according to claim 1, wherein when slow reproduction is repeat slow reproduction, the buffering control unit continues to write video information with a storage area other than the storage area used for the repeat slow reproduction in the buffer as a ring buffer when the buffer is in an overflow state.

14. The image output device according to claim 1, comprising:

an encode unit configured to compress frames acquired from the video information and to generate compressed frames, wherein the blocks are the compressed frames, and the buffer is a frame buffer into which the video information is written per compressed frame.

15. The image output device according to claim 1, wherein the blocks are a GOP.

16. The image output device according to claim 1 wherein the determination unit determines that the buffer is in an overflow state a certain period before the buffer is filled with recording blocks.

17. The image output device according to claim 1, wherein the buffering control unit is configured to control to buffer the video information based on a write pointer which stores the addresses of the blocks into which the video information is written and a read pointer which stores the addresses of the blocks from which the video information is read, changes the address stored in the write pointer into the address of a next block when the video information is completely written into a block indicated by the write pointer, changes a block indicated by the read pointer into a next block when the video information is completely read from the block indicated by the read pointer, and determines that the buffer is in the overflow state when a distance between a block indicated by the write pointer and a block indicated by the read pointer is equal to or less than the preset number of blocks.

18. An image output method comprising:

determining whether a buffer into which video information input in stream data is written per block is in an overflow state due to slow reproduction;

switching a buffering pattern of the video information based on a determination result of whether the buffer is in an overflow state;

reading the video information from the buffer per block and to open the buffer per block; and generating an interpolated frame to be inserted between frames based on information on the frames included in the video information, overwriting the newly-acquired video information in some blocks selected from the non-open blocks when the buffer is in an overflow state, and acquiring the interpolated frame generated based on information on the non-overwritten and left blocks as an overwritten and missing frame.

19. A non-transitory computer readable recording medium recording a program therein, the program causing a computer to function as:

a determination unit configured to determine whether a buffer into which video information input in stream data is written per block is in an overflow state due to slow reproduction;

a buffering control unit configured to switch a buffering pattern of the video information based on a determination result of the determination unit;

a read unit configured to read the video information from the buffer per block and to open the buffer per block; and a frame interpolation unit configured to generate an interpolated frame to be inserted between frames based on information on the frames included in the video information, wherein when the buffer is in an overflow state, the buffering control unit overwrites the newly-acquired video information in some blocks selected from the non-open blocks, and the frame interpolation unit acquires the interpolated frame generated based on information on the non-overwritten and left blocks as an overwritten and missing frame.

* * * * *